United States Patent
Lu et al.

(10) Patent No.: US 7,371,339 B2
(45) Date of Patent: May 13, 2008

(54) PRISMATIC RETROREFLECTOR HAVING A MULTI-PLANE FACET

(75) Inventors: Xiao-Jing Lu, Yorktown, NY (US); Gary J. Gauer, South Windsor, CT (US); David A. Jacob, Hilton, NY (US); Erich Minier, Rochester, NY (US)

(73) Assignee: Reflexite Corporation, Avon, CT (US)

( * ) Notice: Subject to any disclaimer, the term of this patent is extended or adjusted under 35 U.S.C. 154(b) by 751 days.

(21) Appl. No.: 10/625,459

(22) Filed: Jul. 23, 2003

(65) Prior Publication Data

US 2004/0135272 A1  Jul. 15, 2004

Related U.S. Application Data

(62) Division of application No. 09/820,162, filed on Mar. 28, 2001, now Pat. No. 6,626,544.

(51) Int. Cl.
*B29D 11/00* (2006.01)
(52) U.S. Cl. ............... 264/1.9; 264/2.5; 425/808
(58) Field of Classification Search ............ 264/1.34, 264/286, 1.1, 1.9, 2.2, 2.5, 166, 167, 284; 425/808
See application file for complete search history.

(56) References Cited

U.S. PATENT DOCUMENTS

| | | | |
|---|---|---|---|
| 3,712,706 A * | 1/1973 | Stamm | 359/531 |
| 3,873,184 A | 3/1975 | Heenan | |
| 4,076,383 A | 2/1978 | Heasley | |
| 5,565,151 A | 10/1996 | Nilsen | |
| 5,585,164 A | 12/1996 | Smith et al. | |
| 5,600,484 A | 2/1997 | Benson et al. | |
| 6,036,322 A | 3/2000 | Nilsen et al. | |
| 6,206,525 B1 * | 3/2001 | Rowland et al. | 359/530 |
| 6,390,629 B1 | 5/2002 | Mimura et al. | |
| 6,685,323 B1 * | 2/2004 | Mimura et al. | 359/530 |
| 6,770,225 B2 * | 8/2004 | Nilsen et al. | 264/1.9 |
| 6,877,866 B2 * | 4/2005 | Nilsen et al. | 359/530 |
| 6,967,053 B1 * | 11/2005 | Mullen et al. | 428/156 |
| 2001/0021110 A1 * | 9/2001 | Nakayama et al. | 362/247 |

(Continued)

FOREIGN PATENT DOCUMENTS

EP  1 081 511 A1  3/2001

(Continued)

*Primary Examiner*—Mathieu D. Vargot
(74) *Attorney, Agent, or Firm*—Hamilton, Brook, Smith & Reynolds, P.C.

(57) ABSTRACT

A retroreflective structure includes a retroreflective sheeting having an array of transparent prisms formed into pairs of prisms. Each prism includes a base aperture and three intersecting lateral faces meeting at an apex. Each of the lateral faces includes a base edge which forms a portion of the perimeter of the base aperture. The base edge of each lateral face intersects the base edge of a contiguous lateral face to form a base point, the first face of at least one prism in the array including a first face first planar surface and a first face second planar surface. The first face first planar surface and the first face second planar surface are contiguous along an edge having a first and second end points, wherein the apex, the first end point, and a first base point are coplanar and form a continuous edge from the first base point to the apex.

13 Claims, 15 Drawing Sheets

U.S. PATENT DOCUMENTS

2001/0048169 A1* 12/2001 Nilsen et al. ................. 264/2.5
2002/0071183 A1* 6/2002 Mullen et al. ............... 359/529
2002/0196542 A1* 12/2002 Nilsen et al. ............... 359/530

FOREIGN PATENT DOCUMENTS

| WO | WO 95/11465 | 4/1995 |
| WO | WO 95/11470 | 4/1995 |
| WO | WO 96/10197 | 4/1996 |
| WO | WO 98/19842 | 5/1998 |
| WO | WO 98/59266 | 12/1998 |
| WO | WO 00/60385 | 10/2000 |

* cited by examiner

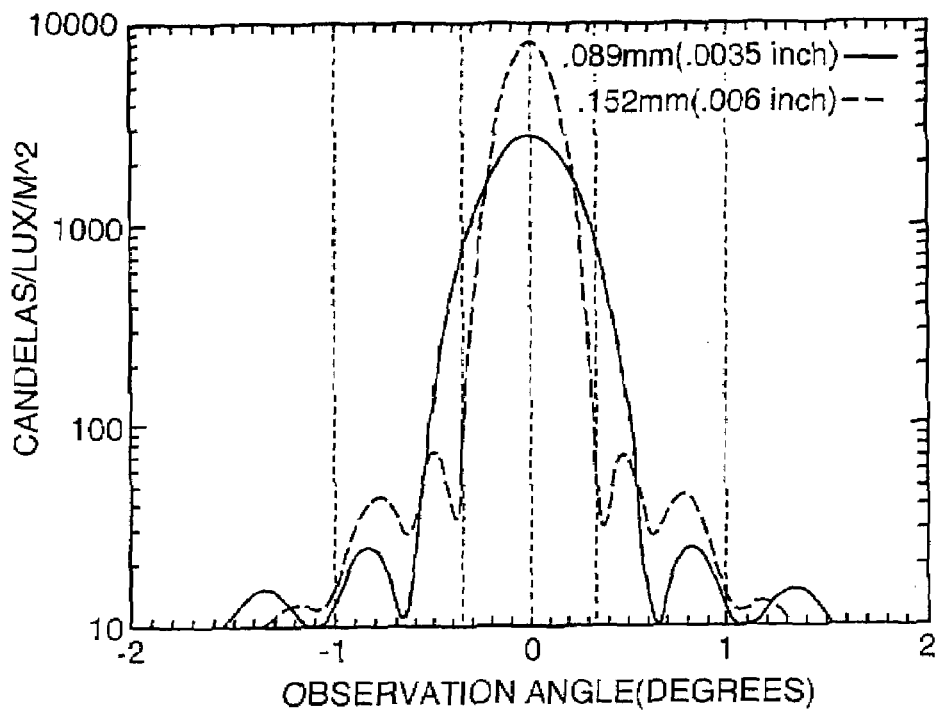
FIG. 6
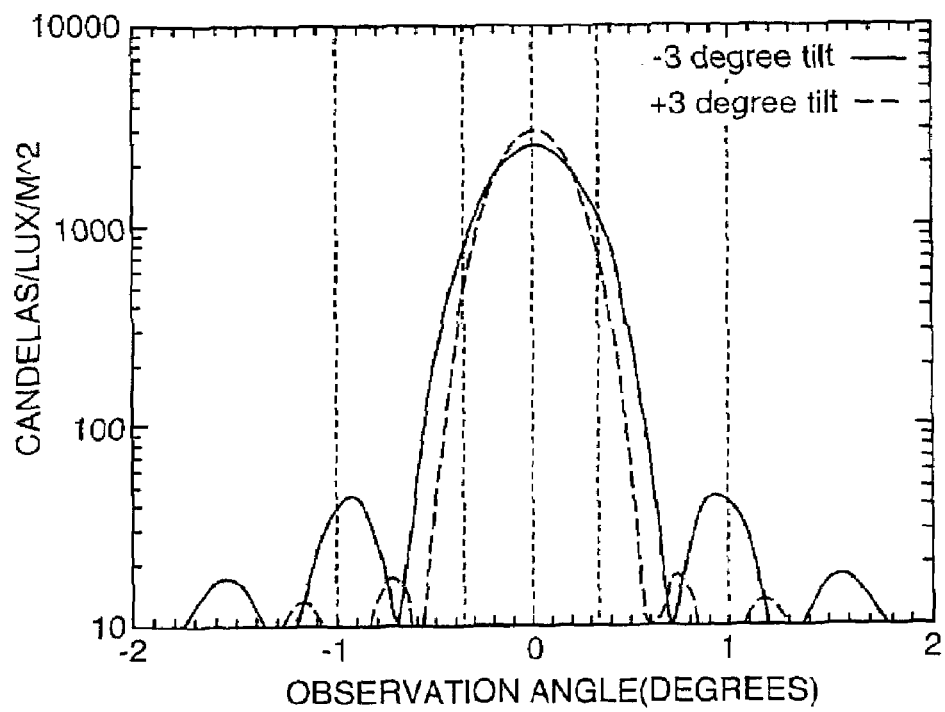
X PROFILES FIG. 7

PAD #3 AIRBACKED PET

PAD #4 AIRBACKED PET

PAD #1 AIRBACKED PET

PAD #2 AIRBACKED PET

PAD #3 METALIZED PET

PAD #4 METALIZED PET

PAD #1 METALIZED PET

PAD #2 METALIZED PET

US 7,371,339 B2

PRISMATIC RETROREFLECTOR HAVING A MULTI-PLANE FACET

RELATED APPLICATION

This application is a Divisional Application of U.S. application Ser. No. 09/820,162, filed Mar. 28, 2001 now U.S. Pat. No. 6,626,544, the entire teachings of which are incorporated herein by reference.

BACKGROUND OF THE INVENTION

Retroreflective sheeting has the ability to redirect light incident upon a major surface of the sheeting toward its originating source. This unique ability has led to the widespread use of retroreflective sheeting in a wide variety of conspicuity enhancement applications relating to traffic and personal safety marking. Typical examples of uses of retroreflective sheeting include the placement of such sheetings on road signs, traffic cones and barricades to enhance their conspicuity, particularly under poor lighting conditions, such as night-time driving conditions or in conditions of inclement weather. These uses typically allow the sheeting to be adhered to relatively flat and rigid surfaces, thereby allowing the sheeting to be relatively inflexible. Additionally, sign applications are characterized by relatively predictable, standardized viewing geometries.

There are essentially two types of retroreflective sheeting, beaded sheeting and cube corner sheeting. Beaded sheeting employs a multitude of independent glass or ceramic microspheres to retroreflect incident light. From the optics perspective, beaded sheeting typically exhibits favorable rotational symmetry and entrance angularity performance because of the symmetrical nature of the beads. Additionally, beaded sheeting typically exhibits relatively good flexibility because the beads are independent from one another. However, beaded sheeting tends to exhibit relatively low brightness when compared to cube corner sheeting.

Cube corner retroreflective sheeting typically employs an array of rigid, interconnected cube corner elements to retroreflect light incident on a major surface of the sheeting. The basic cube corner element is a generally tetrahedral structure having three mutually substantially perpendicular lateral faces which intersect at a single reference point, or apex, and a base triangle opposite the apex. The symmetry axis, or optical axis, of the cube corner element is the axis which extends through the cube apex and trisects the internal space of the cube corner element. In conventional cube corner elements which have an equilateral base triangle, the optical axis of the cube corner element is perpendicular to the plane which contains the base triangle.

In operation, light incident on the base of the cube corner element is reflected from each of the three lateral faces of the element and is redirected toward the light source. Retroreflective sheeting generally incorporates a structured surface including at least one array of cube corner reflective elements to enhance the visibility of an object. When compared with beaded sheeting, cube corner retroreflective sheeting exhibits relatively greater brightness in response to light incident at relatively low entrance angles, for example, near normal light. However, cube corner retroreflective sheeting also exhibits relatively poor rotational symmetry performance at high entrance angles. In addition, cube corner retroreflective sheeting is typically stiffer than beaded sheeting because the cube corner elements are often all interconnected.

The optics of cube corner retroreflective sheetings can be designed to exhibit optimal performance at a specific orientation. This can be accomplished by forming the cube corner elements of the retroreflective sheeting such that their optical axes are canted relative to an axis perpendicular to the base plane of the sheeting. U.S. Pat. No. 4,588,258, issued to Hoopman on May 13, 1986 ('258 Patent), the teachings of which are incorporated by reference herein, discloses retroreflective sheeting which employs optics having canted cube corner elements which form opposing matched pairs. The sheeting disclosed in the '258 Patent exhibits a primary plane of improved retroreflective performance at high entrance angles, identified as the x-plane in the '258 Patent, and a secondary plane of improved retroreflective performance at high entrance angles, identified as the y-plane in the '258 Patent.

In another patent, U.S. Pat. No. 2,380,447, issued to Jungersen on Jul. 31, 1945 ('447 Patent), the teachings of which are incorporated by reference herein, discloses in FIG. 15 of the '447 Patent the optical axis of prism pairs tilting away from the common edge.

In another patent, U.S. Pat. No. 5,171,624, issued on Dec. 15, 1992 to Walter, the teachings of which are incorporated herein in its entirety by reference, discloses microprism reflective sheeting in which prism pairs are tilted with respect to one another at an angle of in the range of between about three and ten degrees, prism size of 0.15-0.64 mm (0.006-0.025 inches) (space between apices) and wherein at least one prism side surface is arcuate. It has been found that the arcuate shaped prism surfaces have been found to be extremely difficult to manufacture.

However, a need still exists for a relatively easy to manufacture retroreflective structure that provides a more uniform distribution of light.

SUMMARY OF THE INVENTION

The present invention is directed to a retroreflective structure having cube corner retroreflective elements. The structure includes a retroreflective sheeting having an array of transparent prisms formed into pairs of prisms. Each prism includes a base aperture and three intersecting lateral faces which meet at an apex. Each of the lateral faces includes a base edge which forms a portion of the perimeter of the base aperture. The base edge of each lateral face intersects the base edge of a contiguous lateral face to form a base point, wherein a first face of at least one prism in the array includes a first face first planar surface and a first face second planar surface. The first face first planar surface and the first face second planar surface are contiguous along an edge having a first end point and a second end point, wherein the apex, the first end point, and a first base point are coplanar and form a continuous edge from the first base point to the apex.

In a preferred embodiment, a second face of the prism having the first face first planar surface and first face second planar surface includes a second face first planar surface and a second face second planar surface. In another preferred embodiment, a third face of the prism having the first face first planar surface and first face second planar surface includes a third face first planar surface and a third face second planar surface. The planar surfaces can form a concave or convex shape as viewed from the exterior of the prism.

In one embodiment, the retroreflective structure includes a prism having a length along at least one base edge between about 0.002 and 0.05 inches (0.0508 and 1.27 millimeters).

Preferably, there is a negative tilt between prism pairs. The array of prisms can be canted between about negative one and negative fifteen degrees. In an alternative embodiment, the prisms are positively canted between about one and fifteen degrees. In a preferred embodiment, the retroreflective structure includes a metalized layer on the facet side of the retroreflective elements for specular reflection.

In accordance with further aspects, a mold for casting retroreflective prisms is provided which includes a plurality of grooves in a body of mold material. The grooves intersect at an angle to form an array of prisms formed into pairs of prisms. Each prism includes a base aperture and three intersecting lateral faces which meet at an vertex. Each of the lateral faces has a base edge which forms a portion of the perimeter of the base aperture. The base edge of each lateral face intersects the base edge of a contiguous lateral face to form a base point. A first face of at least one prism in the array includes a first face first planar surface and a first face second planar surface. The first face first planar surface and the first face second planar surface are contiguous along an edge having a first end point and a second end point, wherein the vertex, the first end point, and a first base point are coplanar and form a continuous edge from the first base point to the vertex.

A second face of the prism having the first face first planar surface and first face second planar surface can include a second face first planar surface and a second face second planar surface. A third face of the prism having the first face first planar surface and first face second planar surface can include a third face first planar surface and a third face second planar surface.

In accordance with further aspects, a method of forming retroreflective sheeting is provided which includes the following steps: Forming a first mold by forming a plurality of grooves in a body of mold material, the grooves intersecting at an angle to form an array of prisms formed into pairs of prisms. Each prism includes a base aperture and three intersecting lateral faces which meet at an apex. Each of the lateral faces include a base edge which forms a portion of the perimeter of the base aperture. The base edge of each lateral face intersects the base edge of a contiguous lateral face to form a base point, wherein a first face of at least one prism in the array includes a first face first planar surface and a first face second planar surface. The first face first planar surface and the first face second planar surface are contiguous along an edge having a first end point and a second end point, wherein the apex, the first end point, and a first base point are coplanar and form a continuous edge from the first base point to the apex.

A second face of the prism having the first face first planar surface and first face second planar surface can include a second face first planar surface and a second face second planar surface. A third face of the prism having the first face first planar surface and first face second planar surface can include a third face first planar surface and a third face second planar surface.

The method further includes the step of forming a second mold in the first mold wherein the second mold comprises a negative prism array pattern. The retroreflective sheeting is then formed in the second mold and removed therefrom.

The invention has many advantages including providing a broader more uniform retroreflection profile than a single or double orientation cube corner prism sheeting. The invention is useful for truck conspicuity enhancement marking.

BRIEF DESCRIPTION OF THE DRAWINGS

FIG. 6 shows a solid curve that is X profile of light distribution given by regular cube corners of 0.0035 inch (0.089 mm) pitch and a dot curve representing a X profile given by 0.006 inch (0.152 mm) pitch cube corners.

FIG. 7 compares two x profiles, which are generated by cube corners of 0.0035 inch (0.089 mm) pitch with −3 degree tilt and +3 degree tilt, respectively.

DETAILED DESCRIPTION OF THE INVENTION

Figure 1:
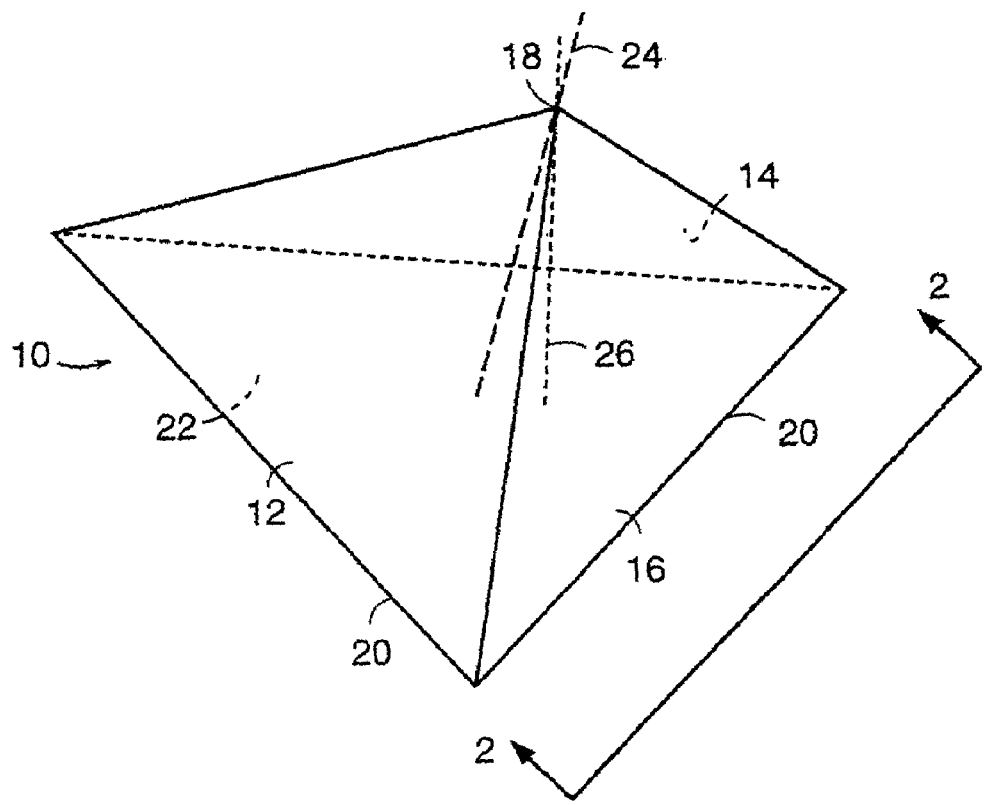
FIG. 1 shows a perspective view of a cube-corner retroreflective element in a retroreflective structure.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention. It will be understood that the particular embodiments of the invention are shown by way of illustration and not as limitations of the invention. The principal features of this invention can be employed in various embodiments without departing from the scope of the invention. All percentages and parts are by weight unless otherwise indicated.

Figure 2:
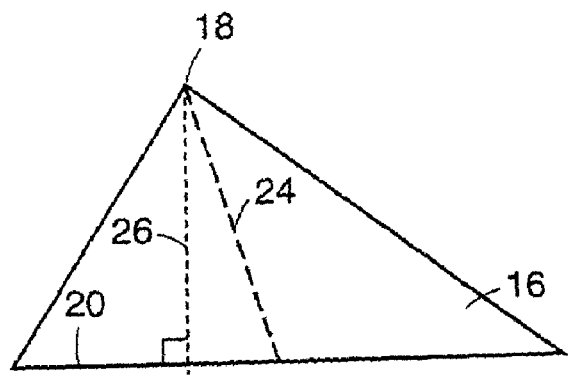
FIG. 2 shows a side elevational view of the lateral faces of the cube-corner retroreflective elements taken along line 2-2 of FIG. 1.

A cube-corner retroreflective element useful in a retroreflective article is shown in a perspective view in FIG. 1 and in side elevation views in FIG. 2. As shown, element 10 has three mutually perpendicular lateral faces 12, 14, 16 which meet at apex 18. Base edges 20 of lateral faces 12, 14, 16 are linear and lie in a single plane, that is, base plane 22 of element 10. Element 10 also has a central or optical axis 24, which is a trisector of the internal angle defined by the lateral faces 12, 14, 16 and which is tilted with respect to a line 26 perpendicular to the base plane 22. Retroreflection occurs when light incident on the base plane 22 of the element is internally reflected by one of the three lateral faces to a second face, then to a third face, and then back through the base toward the source of light.

In retroreflective articles, a cube-corner element, as shown in FIGS. 1 and 2, is generally used with at least one other cube-corner element as part of a matched pair, and commonly is used with an array of such elements. The other cube-corner elements, such as they might appear in an array of elements, are shown in plan view of FIG. 3 which shows the back of a representative retroreflective article 28a. The elements are joined together, for example, by being formed as a part of a single integral sheet material or by being attached at base plane 22 to film 36.

Figure 3:
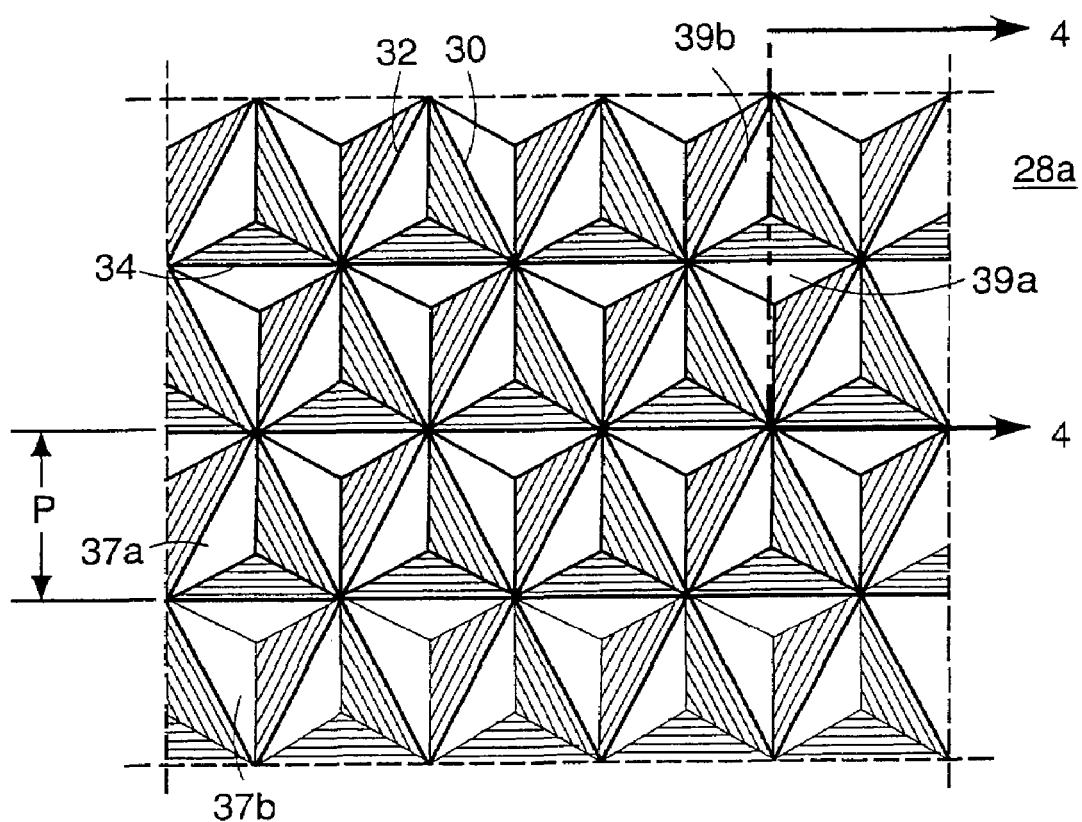
FIG. 3 shows a plan view of a retroreflective sheeting with an array of cube-corner elements as shown in FIGS. 1 and 2.
Figure 4:
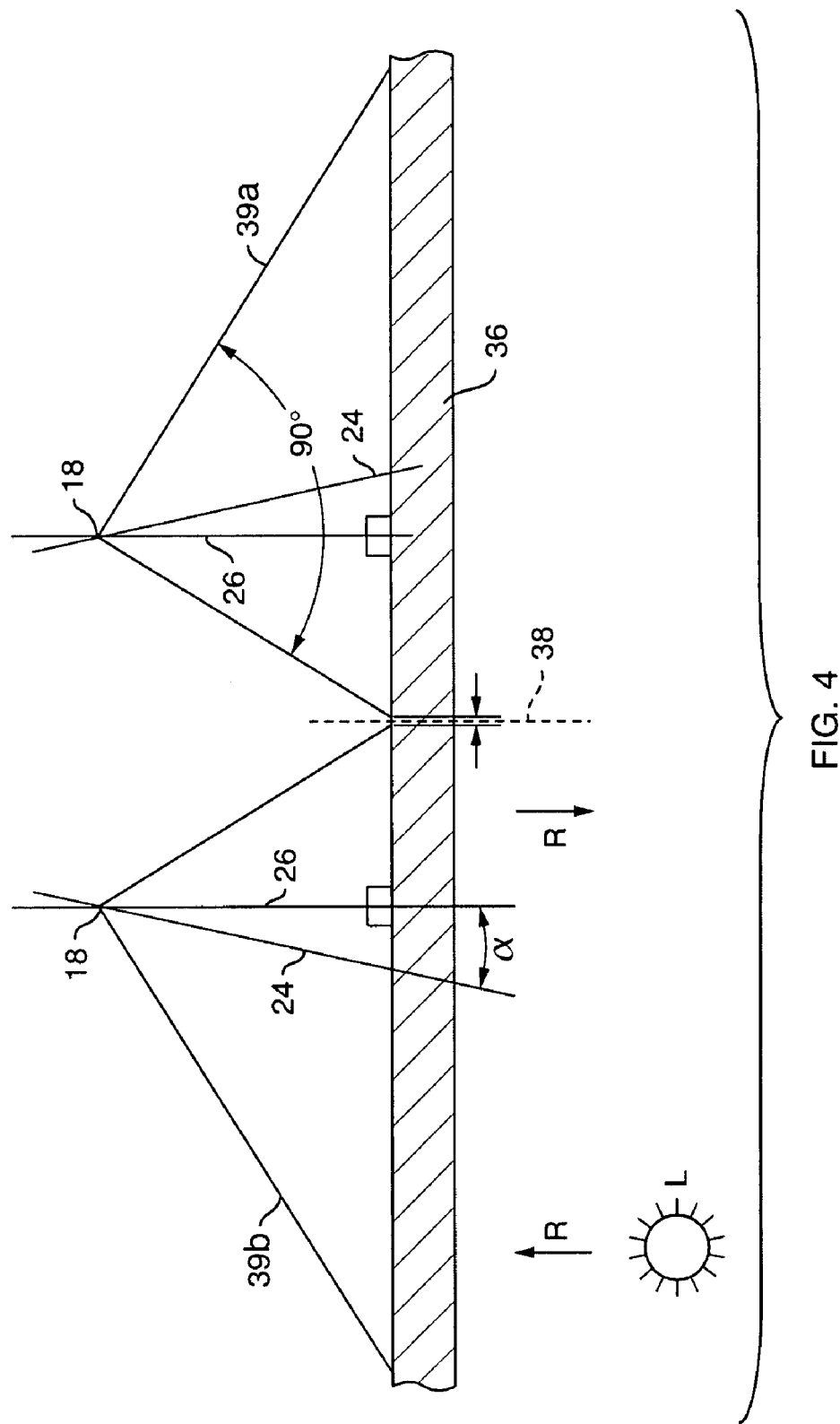
FIG. 4 shows a sectional view taken along line 4-4 of FIG. 3.

FIG. 4 shows in a section view a portion of the retroreflective article pictured in FIG. 3 and shows film 36 of a material, such as a polymeric film, connecting the elements 39a, 39b together. Because base edges 20 of retroreflective element 10 are linear and in a common plane, an array of such elements is defined by intersecting sets of grooves. Referring to FIG. 3, element 10 is defined by three V-shaped grooves 30, 32, 34 which are each one member of three sets of grooves which cross the array in an intersecting pattern to form matched pairs of prism elements. Matched pair of prisms 37a, 37b has a height (h) dimension and a length (l) dimension. In a preferred embodiment with a negative three degree tilt, the height dimension has a range of between about 0.002 and 0.05 inches (0.0508 and 1.27 millimeters). The length dimension has a range of between about 0.002 and 0.05 inches (0.0508 and 1.27 millimeters). The pitch p, or distance between grooves, can have a range between about 0.0018 and 0.045 inches (0.0457 and 1.143 mm).

As shown in FIG. 4, light ray (R) from light source (L) is incident on and passes through film 36 to retroreflective element 10 where it is internally reflected and returns through film 36. The matched pair of retroreflective elements 10 has center line 38 that is parallel with lines 26. The shown match pair has a negative tilt from center line 38 as indicated by angle $\alpha$ between optical axis 24 and line 26. The optical axis 24 diverges from center line 38 in the direction of light source L. Conversely, for a positive tilt matched pair, the optical axis converges with the center line in the direction toward the light source. In one embodiment, the tilt can range from about negative one to negative fifteen degrees. In another embodiment, the tilt can be zero. In a preferred embodiment, the tilt is about negative three degrees. In alternative embodiments, the prisms are positively canted between about one and fifteen degrees.

The matched prisms can have a space (s) between the prisms. In one embodiment, the space has a length of between about 0.00002 and 0.004 inches (0.0005 and 0.102 millimeters). The spacing (s) in between the cubes on one or more edges is for the purpose of enhancing specular reflection of the sheeting. The space can be either flat or of a specific optical shape. The improvement in the luminance factor can be substantial. To enhance the specular reflection from this surface even further, the surface can be etched, lapped, abraded, bead blasted, laser written, compression molded, or any other type of material removal or deforming process which creates a non-uniform surface. A buffed flat surface can double the luminance value of an aluminum metalized part with only a ten percent loss in retroreflected brightness values. The buffing adds textures to the flat surface. The spacing can be created in the mastering process or in subsequent processes from the lifts of the master.

Generally, the prisms are made by forming a master on a flat surface of a metal plate or other suitable material. To form regular cube corners, three series of parallel equidistance intersecting V-shaped grooves 60 degrees apart are inscribed in the flat plate. When the groove angle is 70 degrees 31 minutes 43.6 seconds, the angle formed by the intersection of two cube faces (the dihedral angle) is 90 degrees and the incident light is reflected back to the source. The female replicant die is then used to process the desired cube-corner array into a rigid flat plastic surface. For automobile headlight reflectors, the dihedral angle is changed so that the incidental light is reflected non-orthogonally towards the driver instead of the source.

Further details concerning the structures and operation of cube-corner microprisms can be found in U.S. Pat. No. 3,684,348, issued to Rowland on Aug. 15, 1972, the teachings of which are incorporated by reference herein. A method for making retroreflective sheeting is also disclosed in U.S. Pat. No. 3,689,346, issued to Rowland on Sep. 5, 1972, the teachings of which are incorporated by reference herein. The disclosed method is for forming cube-corner microprisms in a cooperatively configured mold. The prisms are bonded to sheeting which is applied thereover to provide a composite structure in which the cube-corner formations project from one surface of the sheeting. The preferred materials for forming the sheetings can be any transparent polymer film. Polycarbonate, polyester, polyvinyl chloride, polyurethane are most commonly used.

The retroreflective sheeting of the present invention can be constructed generally according to the sheeting as disclosed in U.S. Pat. No. 5,648,145, issued to Martin on Jul. 15, 1997, or U.S. Pat. No. 3,712,706, issued to Stamm on Jan. 23, 1973, the teachings of both are incorporated by reference herein. More particularly, Martin discloses "air-backed" retroreflective sheeting wherein the microprism elements are arranged so that the light to be retroreflected impinges into the internal spaced defined by the faces, and retroreflection of the impinging light occurs by total internal reflection of the light from face to face of the element. Impinging light that is inclined substantially away from the axis of retroreflection of the element (which is the trisector of the internal space defined by the faces of the element) strikes the face at an angle less than its critical angle, thereby passing through the face rather than being reflected.

Figure 5:
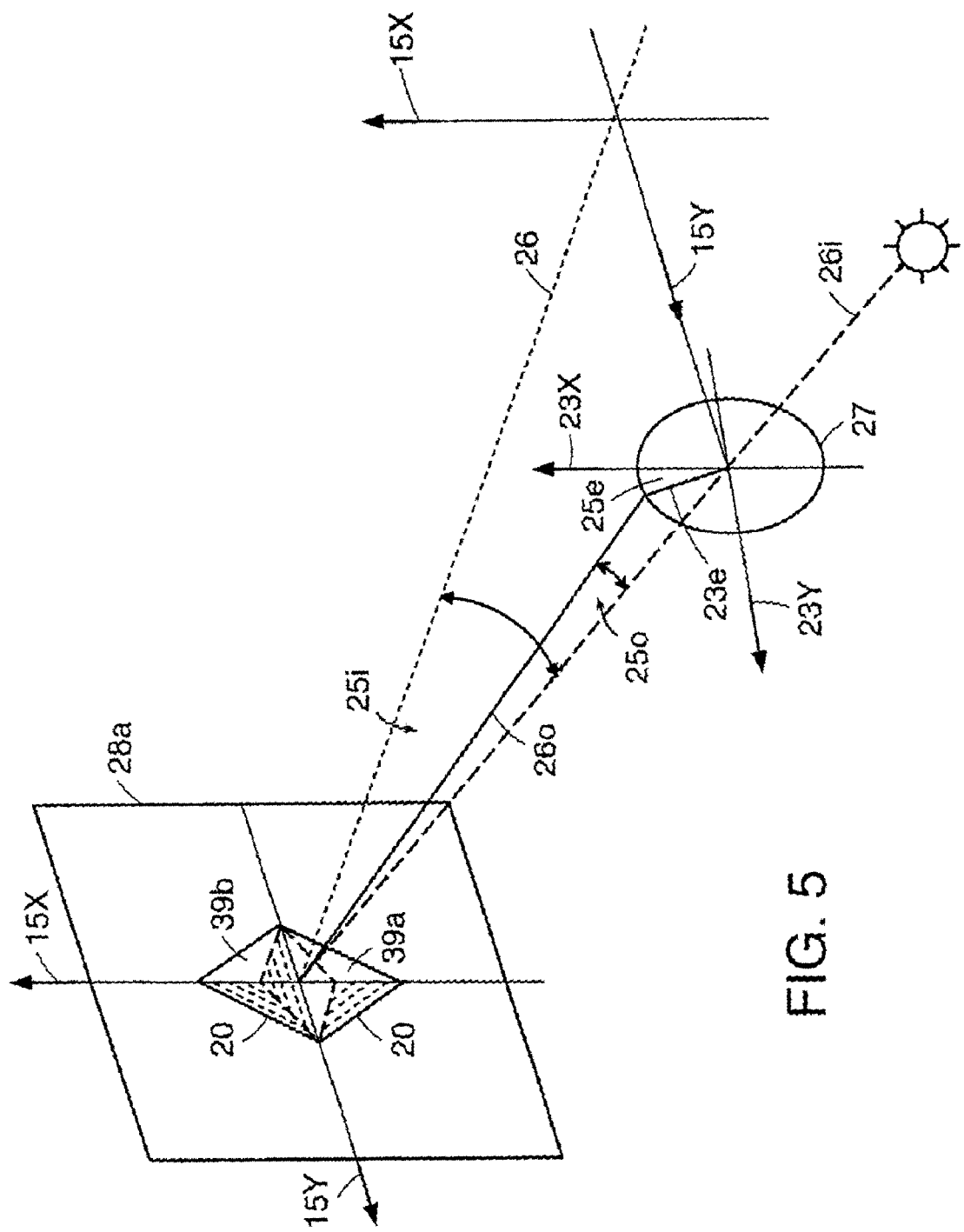
FIG. 5 is a perspective view of a prismatic sheet illustrating definitions of technical terms used to evaluate performance of the prismatic sheet.

In order to evaluate the performance of the prismatic sheets, one should consider the diffraction effect due to the edges 20 of a cube corner pair, as shown in FIG. 5, in which, only a pair of cube corners 39a and 39b are shown on retroreflective article 28a. Arrow 15x represents a coordinate direction X, and arrow 15y represents another coordinate direction Y in retroreflective plane 28a. A dash dot line 26 is the reference line which is normal to the prismatic sheet 28a, a dashed line 26i connecting the center of the prismatic sheet and the light source, which defines the incident axis. A solid line 26o is drawn from the center of prismatic sheet to the detector or human eyes, which is called the observation axis. A circle 27 represents a cross section (a plane), which is normal to the incident axis 26i. Arrow 23x represents a coordinate direction X, and arrow 23y denotes another coordinate direction Y' in cross section plane 27. The entrance angle 25i is the angle between the incident axis 26i and the reference axis 26. The observation angle 25o is the angle between the observation axis 26o and incident axis 26i. A plane containing the incident axis 26i and observation axis 26o can be oriented at different directions and has intersecting line 23e, which defines an orientation angle 25e, which is measured from the X axis to the line 23e.

When a parallel light beam along the incident axis 26i illuminates retroreflective sheet 28a, as shown in FIG. 5 at a certain incident angle, for example, 5 degrees, the reflected light comes out from retroreflective sheet 28a mainly goes back to the opposite direction of the impinging light beam. Most of rays go along the direction which is just opposite to the impinging ray and some rays depart from the direction and spread to a narrow cone of solid angle of a few degrees (typically the solid angle is from −2 to 2 degrees). There is, thus, a light distribution over the cross section 27, which is usually described as a function of the observation angle, the orientation angle, and the incident angle. The light distribution is changed as the distance from the retroreflective sheet 28a to the cross section 27 increases. It becomes stable when the distance approaches infinity. A reasonable distance to obtain a stable light distribution of a prismatic sheet whose pitch ranged from 0.002 to 0.05 inches (0.051 to 0.127 mm), is about 50 feet (15.24 m). The light distribution vs. angles is also called a diffraction pattern in a far field. The diffraction occurs due to the edges 20 of each cube corners in FIG. 5. A typical light distribution from a pair of cube corners can be generated by ray trace and diffraction calculation. A set of theoretical data is obtained and further correlated with the photometric data measured in the lab at specified observation angles, orientation angles, and entrance angles.

Two factors or specifications of corner cubes (or prismatic sheets) can affect their performance mostly. One factor is the single corner cube size on a prismatic sheet, which is described in terms of the pitch of the corner cube. There can be three different pitches in three directions for a prismatic sheet. Each one of them represents a cutting spacing in the corresponding direction. For a regular prismatic material, these three directions form sixty degree angles among any two of them. Thus, one pitch is usually chosen as the main pitch to represent the corner cube size in most cases. The pitch is shown in FIG. 3 as dimension (p) for matched pair of prisms 37a, 37b. The corner cube pitch is small and ranges from about 0.001 to 0.01 inches (0.025 and 0.25 millimeters). In one embodiment, the pitch ranges from between about 0.002 and 0.006 inches (0.05 and 0.15 millimeters). In a preferred embodiment, the pitch ranges from between about 0.0035 and 0.0045 inches (0.088 and 0.114 millimeters).

FIG. 6 shows two curves representing X profiles of light distributions, which are produced by illuminating two prismatic sheets of 0.0035 and 0.006 inch (0.089 and 0.152 mm) pitches with white light in the calculation. The x profiles were generated theoretically for the purpose of evaluation of the cube corner design. The prismatic sheet of 0.0035 inch (0.089 mm) pitch (solid curve) has less brightness than that of the sheet of 0.006 inch (0.152 mm) pitch at observation angles between −0.2 to +0.2 degrees and higher brightness at observation angles from −0.5 to −0.2 and from +0.2 to +0.5 degrees.

A second factor that can affect performance is the direction of the corner cube optical axis which is described by the tilt angles. Two angles are needed to define the optical axis. One angle is defined as an angle formed between the optical axis and the main pitch direction (or machine direction of a prismatic sheet casting process) that is named the X direction. This angle is called the tilt angle. The second is defined as an angle by which a plane containing the optical axis and the actual pitch direction is rotated with respect to the X direction. In many design cases of corner cubes or prismatic materials, the second angle is selected to be zero so that it is sufficient to utilize a tilt angle to describe its optical direction. The tilt angle is usually categorized as positive and negative tilts.

FIG. 7 shows two x profiles of light distribution, which are theoretically generated by two sheets of 0.0035 inch (0.089 mm) pitch with −3 degree tilt and with +3 degree tilt, respectively, under white light illumination. The sheet of −3 degree tilt (solid curve) has a lower center brightness and higher brightness at observation angles of 0.33 and 0.5 degrees than the sheet of +3 degree tilt (not curve).

Figure 8:
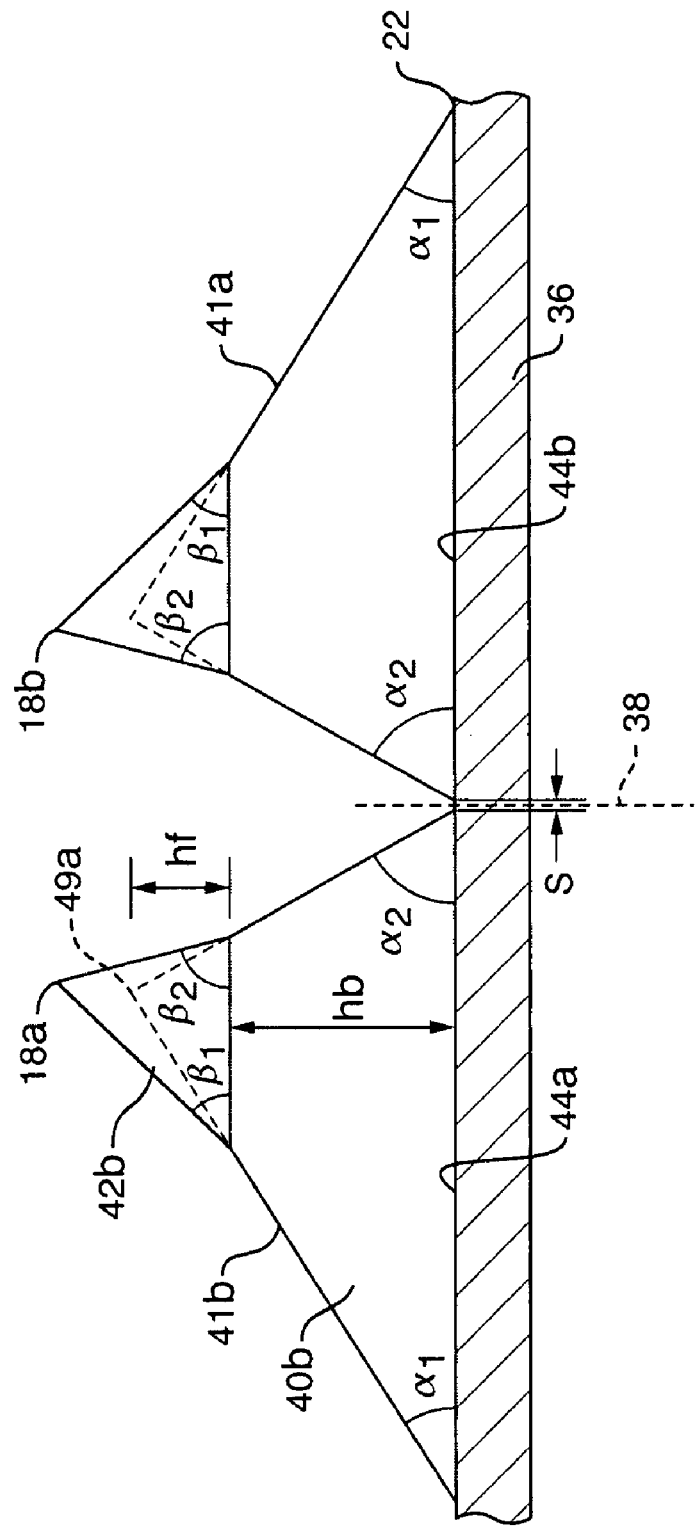
FIG. 8 shows a sectional view of a preferred embodiment of microprism elements constructed according to the principles of the present invention.
Figure 9:
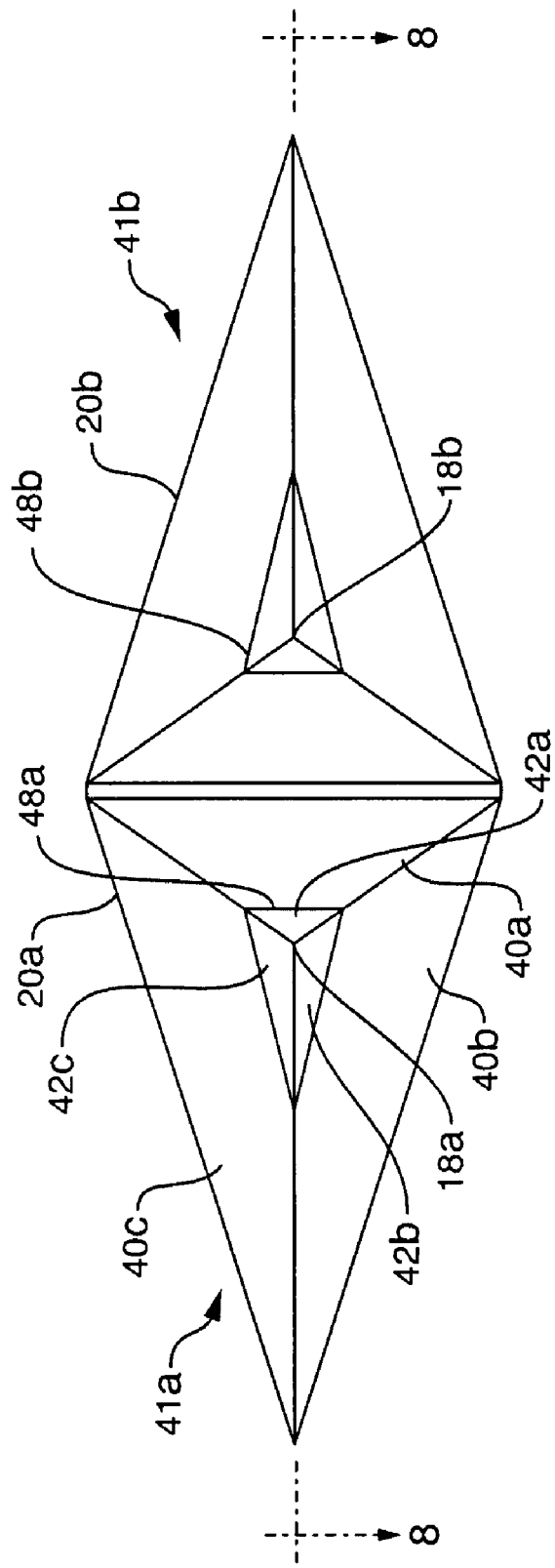
FIG. 9 is a top view of the microprism elements of FIG. 8.

FIG. 8 shows matched prism elements 41a, 41b constructed according to the principles of the present invention in section view while FIG. 9 shows a top view of the prism elements of FIG. 8. Generally, in an array of prisms at least one of the prism elements 41a, 41b includes at least one lateral face with two or more planes thereon. The benefit of constructing a prism or array of prisms in this fashion is to significantly alter, e.g., more broadly and uniformly distribute in a desired manner, the light output pattern due to retroreflection of the altered lateral faces. The light output is altered because of a change in the effective aperture shape 44a, 44b along with a change in the angular planes of each lateral face. Essentially, two different performing prisms are joined together on top of each other to form each element 41a, 41b which preferably retroreflects light with greater uniformity.

Each prism element 41a, 41b includes base edges 20a and 20b, which form the perimeter of base apertures 44a, 44b. In a preferred embodiment, at least one lateral face of at least one prism, for example, prism element 41a, includes a first face first planar surface 40*a* and a first face second planar surface 42*a*, which form a middle edge 48*a*.

In another embodiment, two or more lateral faces of the prism element 41*a* can include the second face first planar surface and the second face second planar surface. These faces can be referred to as second face first planar surface 40*b*, second face second planar surface 42*b*, third face first planar surface 40*c*, and third face second planar surface 42*c*. As illustrated in FIGS. 8 and 9, each lateral face of the prism element 41*a* can include the first planar surfaces 40*a*, 40*b*, 40*c* and the second planar surfaces 42*a*, 42*b*, 42*c*. In the matching pair, prism element 41*b* includes three first planar surfaces, three second planar surfaces, and a middle edge 48*b*. The first planar surfaces and the second planar surfaces of prism elements 41*a* and 41*b* are contiguous along respective edges 48*a* and 48*b*, which can be regarded as middle apertures, as illustrated.

The first planar surfaces and second planar surfaces shown in FIGS. 8 and 9 form a concave shape as viewed from the exterior of the prism. In a preferred embodiment, the first surface angle $\alpha_2$ can have an angle measurement in the range of about 34 and 74 degrees and preferably about 57.591 degrees. The second surface angle $\beta_2$ can have angle measurement in the range of about 34 and 74 degrees and preferably about 57.858 degrees.

As shown in FIG. 8, $h_b$ is the height between the middle plane 48 and base plane 44 and $h_t$ is the height of apex 18*a* from the middle plane 48. The ratio between $h_t$ and $h_b$ is related to the structure of the invented prism. For instance, ratio of one means $h_t$ equals $h_b$ providing equally folded faces and the ratio of 10 provides a structure in which the main part is the second planar surface and the first planar surface is just a narrow strip. In general, the range of the ratio of $h_t$ over $h_b$ can be from zero to infinity, which are two extreme cases. A preferable ratio of $h_t$ over $h_b$ is in a range of between about 0.1 and about 100.

Figure 10:
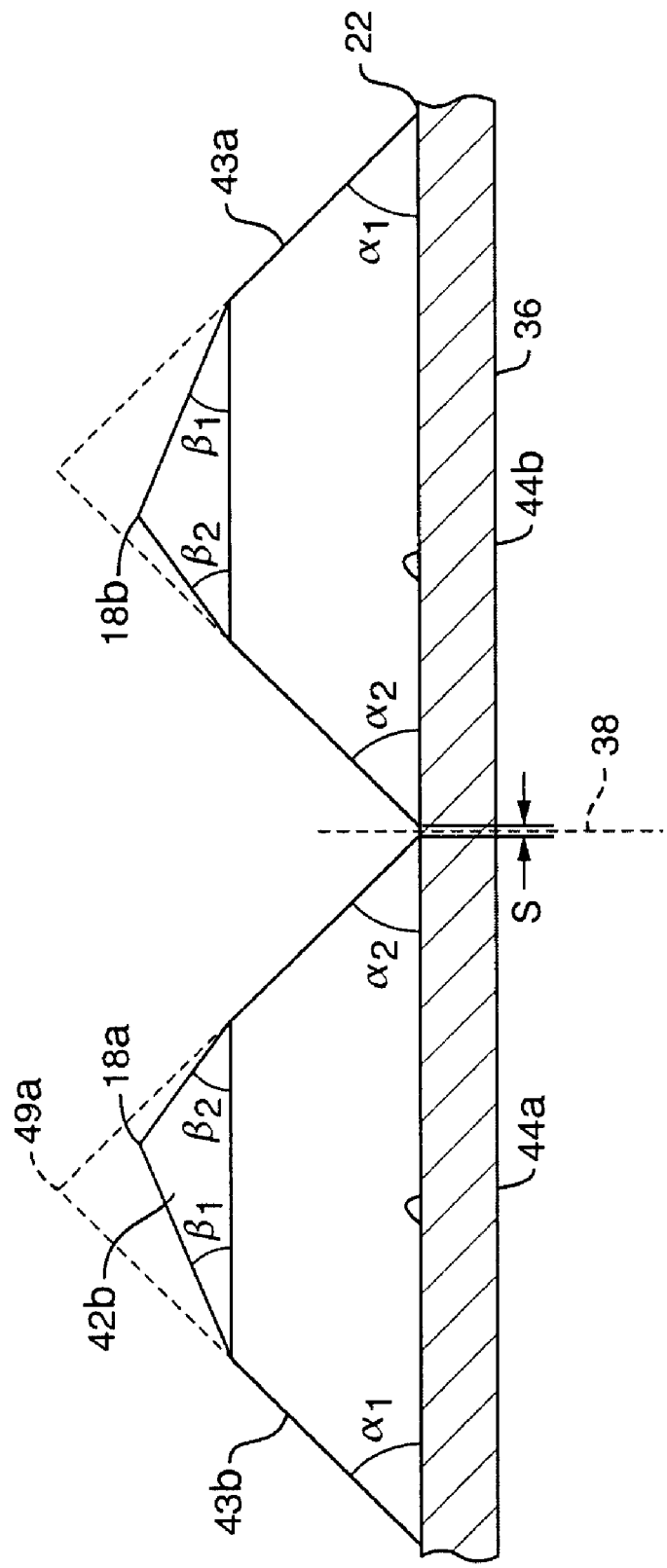
FIG. 10 shows a sectional view of another preferred embodiment of microprism elements constructed according to the principles of the present invention.
Figure 11:
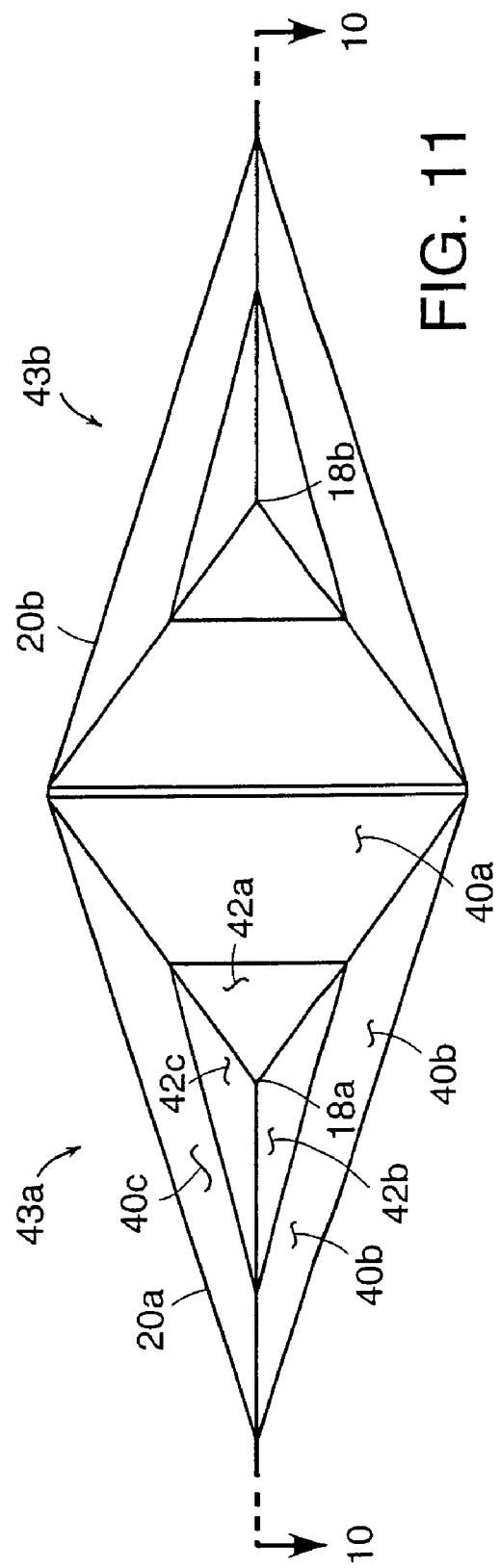
FIG. 11 is a top view of the microprism elements of FIG. 10.

FIGS. 10 and 11 illustrate matched prisms elements 43*a*, 43*b* which are constructed similar to prisms 41*a*, 41*b*. However, in this embodiment, the first planar surface and the second planar surface form a convex shape as viewed from the exterior. In this embodiment, the first surface angle $\alpha_2$ can have an angle measurement in the range of about 34 and 74 degrees and preferably about 57.858 degrees. The second surface angle $\beta_2$ can have angle measurement in the range of about 34 and 74 degrees and preferably about 57.591 degrees.

The prisms of FIGS. 8 and 10 can be canted (tilted) in a positive or negative direction. The canting is measured based on the first planar surfaces 40*a* and 40*b* extending to a theoretical peak 49*a*, 49*b* from which a cant can be calculated as disclosed in FIG. 4.

An evaluation program has been made to predict the performance of a prismatic sheet as shown in FIGS. 10 and 11. A design specification is as follows: its pitch is 0.0053 inch (0.135 mm) with no tilt; each face has two planar surfaces that form a convex shape. There are three identical face angles $\alpha_2$ and three identical angles $\beta_2$. Angle $\alpha_2$ is six minutes larger than angle $\beta_2$ that is the regular prism angle, 54 degree 44 minutes 8.2 seconds.

Figure 12:
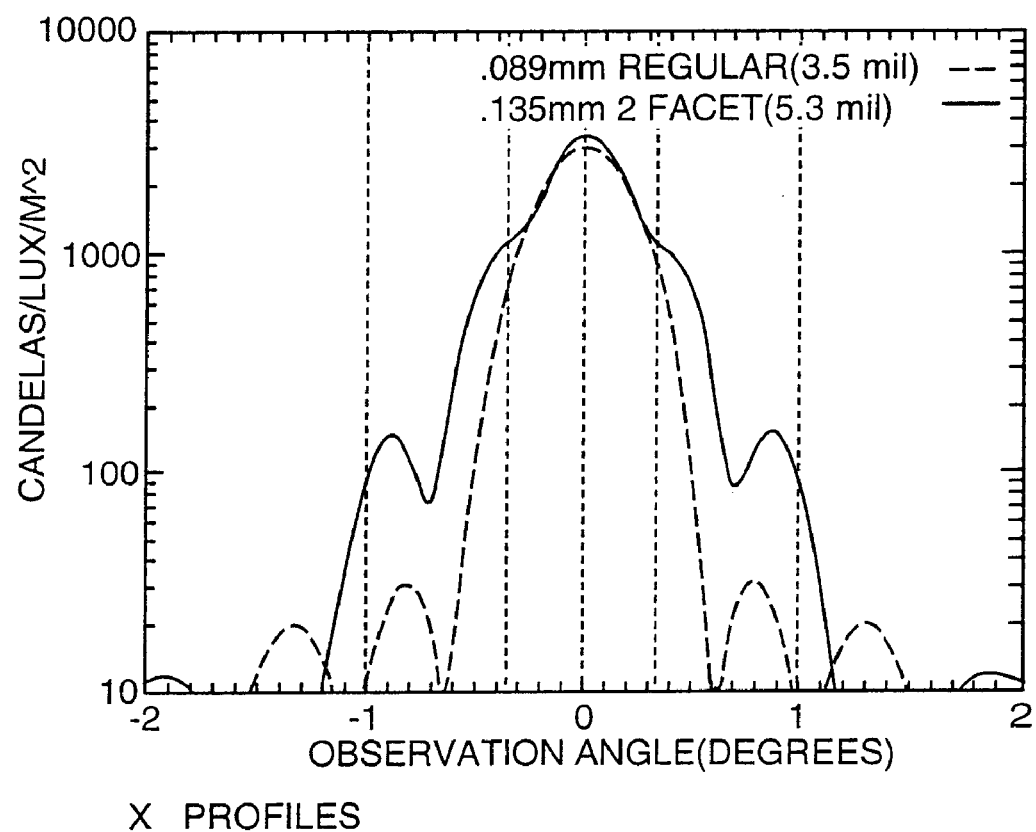
FIG. 12 displays two x profiles in which the solid curve denotes the brightness along X direction given by cube corners of 0.0053 inch (0.135 mm) pitch with two surfaces on each face and the dot curve is the x profile of regular cube corners of 0.0035 inch (0.089 mm) pitch.

FIG. 12 shows a solid curve, which represents a X profile of light distribution given by the above prismatic sheet of 0.0053 inch (0.135 mm) pitch having two surfaces on each face. A dot curve is shown as a reference in FIG. 12, which is also a X profile of light distribution but given by a sheet having regular cube corners of 0.0035 inch (0.089 mm) pitch with no tilt. The cube corners having two surfaces on each face have higher brightness than that of the regular sheet of 0.0035 inch (0.089 mm) pitch at 0.33, 0.50, and 1.0 degree observation angles.

The multi-planar prisms of the present invention can be formed by modifying a process disclosed in U.S. Pat. No. 5,512,219, issued to Rowland et al. on Apr. 30, 1996, the contents of which are incorporated herein by reference. Rowland et al. disclose a method for forming a reusable mold for curing a microstructure matrix of a radiation curable plastic material having an array of prisms elements. An embossing mold having a facet side with a positive array of prism elements and a base side is formed. A polymeric compound is molded on the facet side of the embossing mold to form a polymeric mold comprising a negative array of retroreflective prism elements. The retroreflective sheeting is formed in the negative array of retroreflective prism elements and thereafter removed from the mold.

Preferably, in the present invention, an embossing mold or first mold is formed by forming a plurality of grooves 30, 32, 34 in a body of mold material as shown in FIG. 3. The grooves 30, 32, 34 intersect at an angle to form an array of prisms formed into pairs of prisms having at least one prism in the array which includes a first face first planar surface and the first face second planar surface as shown, for example, in FIGS. 8 and 9. The three-planar faces can be formed by cutting the face a second time at a second angle over a portion of the face. The prisms of the first mold may further include a second face first planar surface and a second face second planar surface and a third face first planar surface and a third face second planar surface.

A second mold or casting mold (not shown) is formed in the first mold which is a negative prisms array pattern of the first mold. Thus, the apex of the first mold corresponds to the vertex of the second mold. The retroreflective sheeting is formed in the negative array of retroreflective prism elements and thereafter removed from the mold.

EXAMPLES

FIGS. 13, 14, 15, and 16 illustrate different examples of retroreflective sheeting 28*b*, 28*c*, 28*d*, 28*e* which include various patterns formed from microprisms having multi-planar faces. These microprisms include convex multi-planar faces as described below in which the angle between the faces is about 179.73 degrees (180°–16'/60°). Of course, other patterns can be constructed according to the principles of the present invention in order to achieve a desired retroreflected light pattern.

Typical cube corner prisms retroreflect light in a central first maximum and six circumferentially spaced radially extending secondary maxima exit-energy patterns as disclosed and shown in FIG. 4 of U.S. Pat. No. 5,171,624, issued to Walter on Dec. 15, 1992, the teachings of which are incorporated herein by reference.

FIGS. 17, 18, 19, and 20 illustrate retroreflected light output patterns at a far field from air-backed polyester retroreflective sheetings with multi-planar faces constructed according to FIGS. 13, 14, 15, and 16, respectively.

Each sheeting is preferably coated with a specular reflective coating on at least some of the prism facets to enhance retroreflective performance and to aid in manufacture of a thin product. The resulting sheeting can be referred to as metalized retroreflective sheeting. The coatings can be aluminum, silver, gold or similar which aid in similar desired properties. FIGS. 21, 22, 23, and 24 illustrate retroreflected light output patterns at a far field from metalized polyester retroreflective sheetings with multi-planar faces constructed according to FIGS. 13, 14, 15, and 16, respectively.

Example 1

Figure 13:
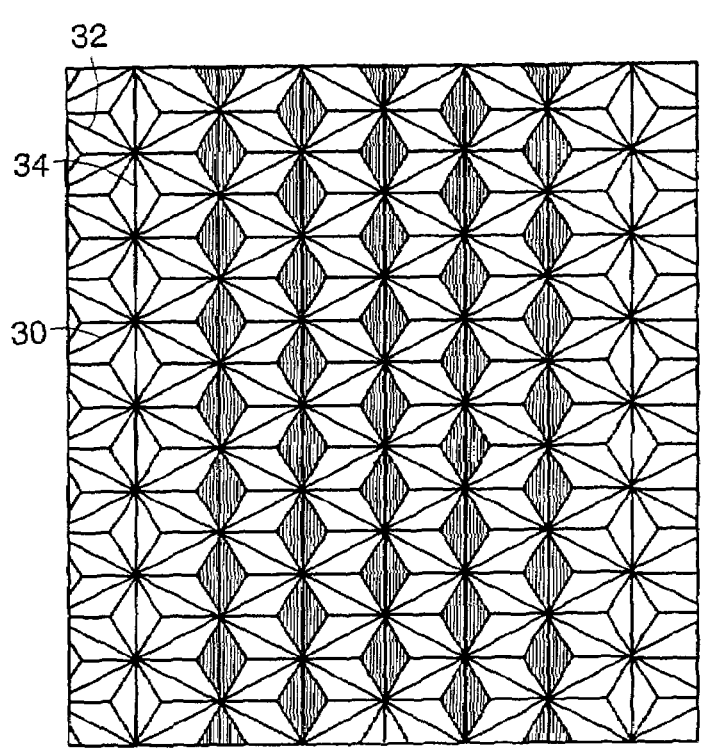
FIG. 13 illustrates a plan view of a retroreflective sheeting having multi-planar faces in one set of grooves.

The retroreflective sheeting 28b of FIG. 13 illustrates multi-planar faces of the prism faces adjacent V-shaped grooves 34. It is noted that FIG. 17, for the air-backed sheeting, and FIG. 21, for the metalized sheeting, display light generally concentrated on a single axis.

Example 2

Figure 14:
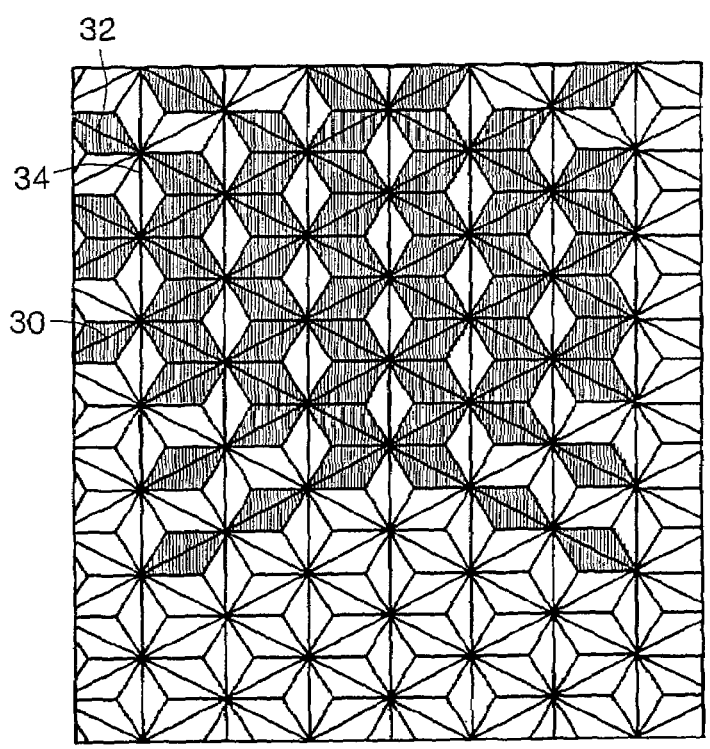
FIG. 14 illustrates a plan view of retroreflective sheeting having multi-planar faces in two sets of grooves.
Figure 18:
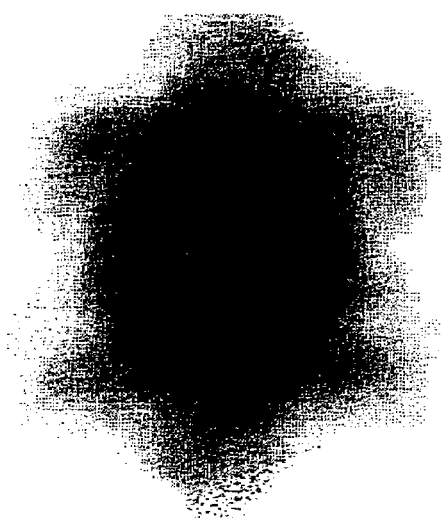
FIG. 18 displays the retroreflective light output pattern at a far field from air-backed retroreflective sheeting with multi-planar faces constructed according to the array disclosed in FIG. 14.
Figure 19:
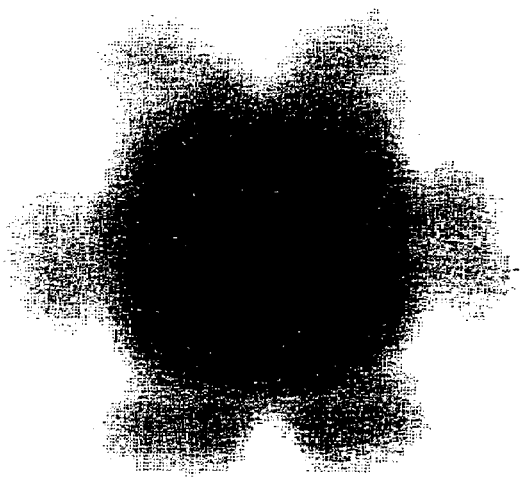
FIG. 19 displays the retroreflective light output pattern at a far field from air-backed retroreflective sheeting with multi-planar faces constructed according to the array disclosed in FIG. 15.
Figure 20:
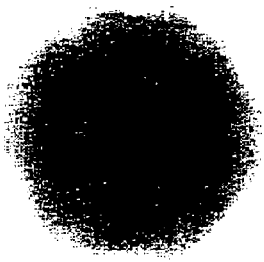
FIG. 20 displays the retroreflective light output pattern at a far field from air-backed retroreflective sheeting with multi-planar faces constructed according to the array disclosed in FIG. 16.
Figure 21:
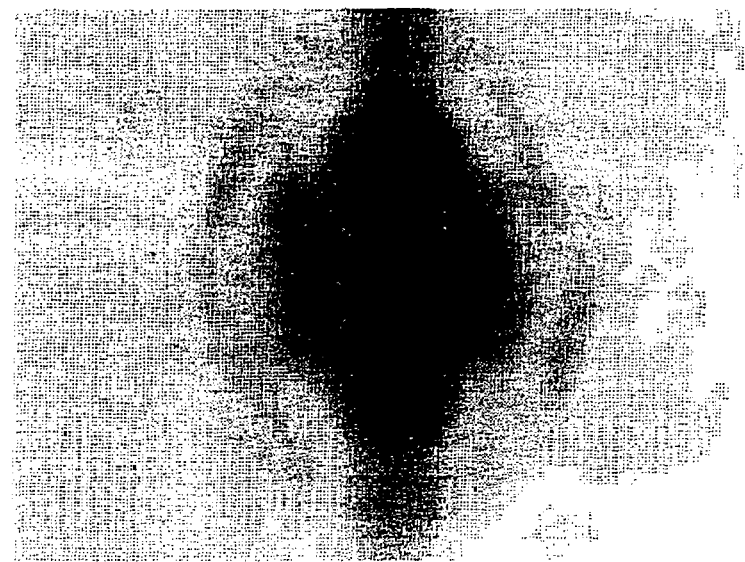
FIG. 21 displays the retroreflected light output pattern at a far field from metalized retroreflective sheeting with multi-planar faces constructed according to the array disclosed in FIG. 13.
Figure 22:
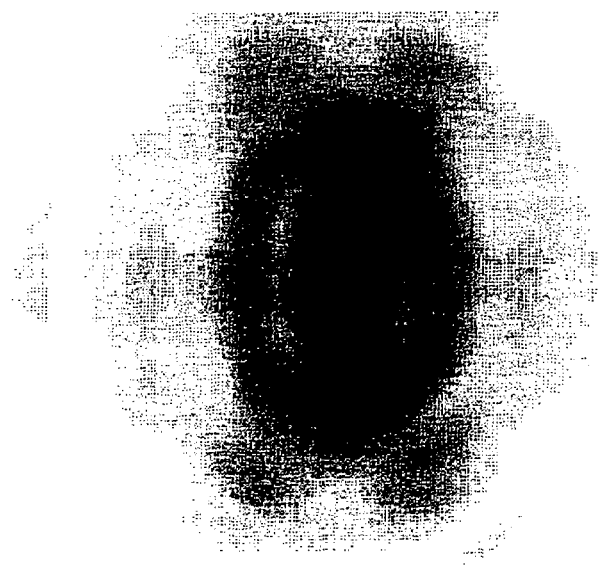
FIG. 22 displays the retroreflected light output pattern at a far field from metalized retroreflective sheeting with multi-planar faces constructed according to the array disclosed in FIG. 14.
Figure 23:
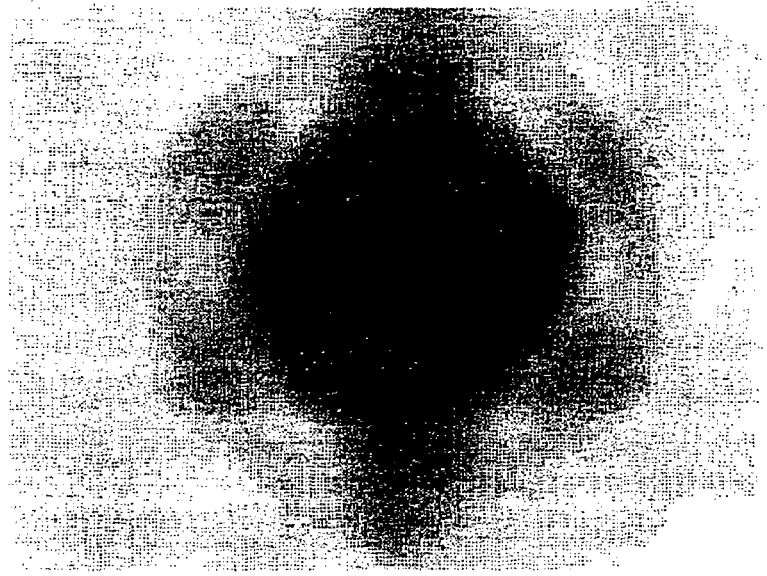
FIG. 23 displays the retroreflected light output pattern at a far field from metalized retroreflective sheeting with multi-planar faces constructed according to the array disclosed in FIG. 15.
Figure 24:
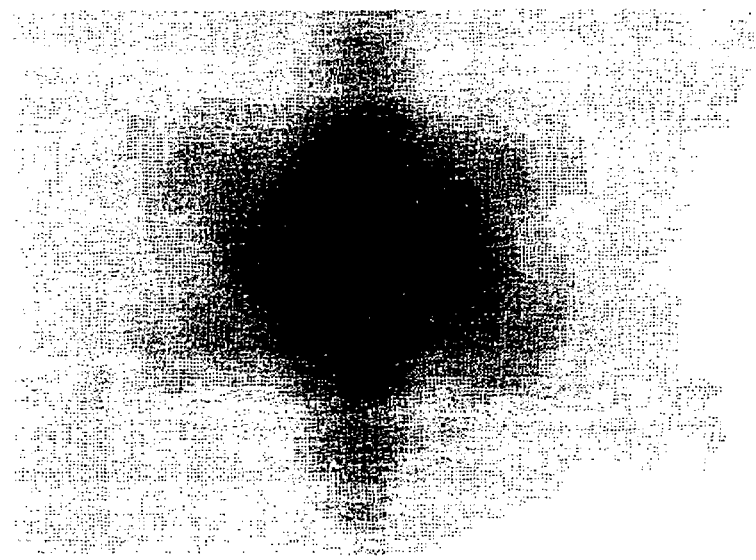
FIG. 24 displays the retroreflected light output pattern at a far field from metalized retroreflective sheeting with multi-planar faces constructed according to the array disclosed in FIG. 16.

The retroreflective sheeting 28c of FIG. 14 illustrates multi-planar faces of the prism faces adjacent V-shaped grooves 30 and 32 at 60 degrees to one another. FIG. 18, for the air-backed sheeting, and FIG. 22, for the metalized sheeting, illustrate light generally concentrated on two axis and resembles an X pattern shape.

Example 3

Figure 15:
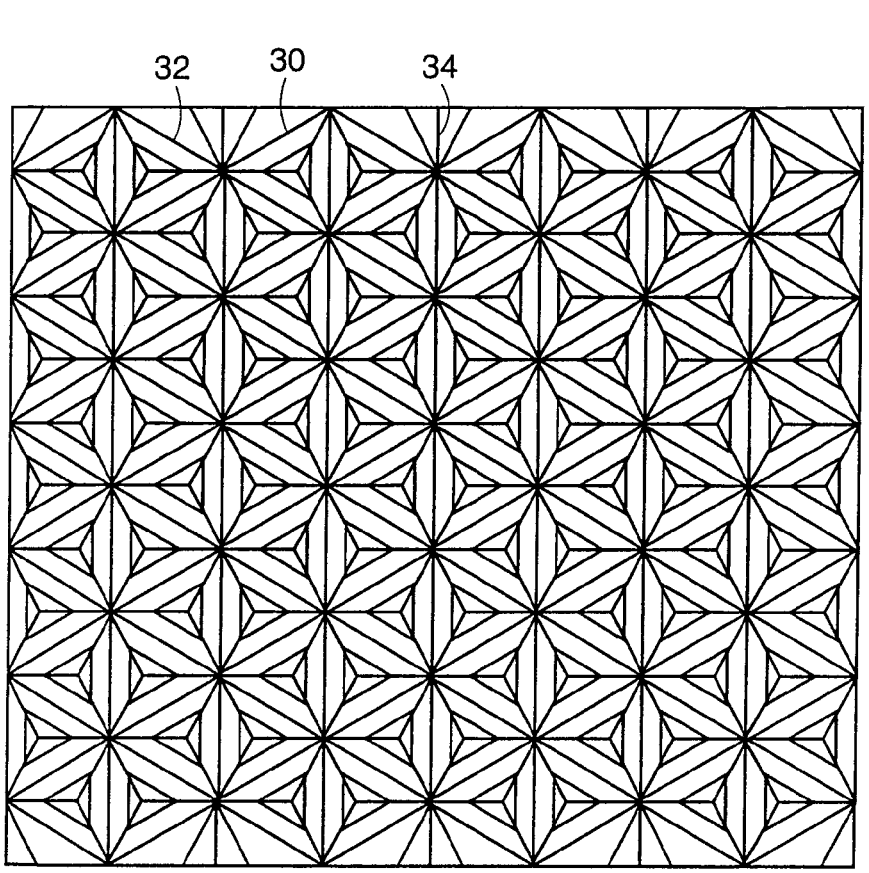
FIG. 15 illustrates a plan view of retroreflective sheeting having multi-planar faces in three sets of grooves.

FIG. 15 illustrates retroreflective sheeting 28d having multi-planar faces of the prism faces adjacent each V-shaped groove 30, 32, and 34, i.e., similar to the prism elements 41a, 41b and 43a, 43b. The light output patterns illustrated in FIGS. 19 and 23 for the air-backed sheeting and metalized sheeting, respectively, are generally concentrated on three axes.

Example 4

Figure 16:
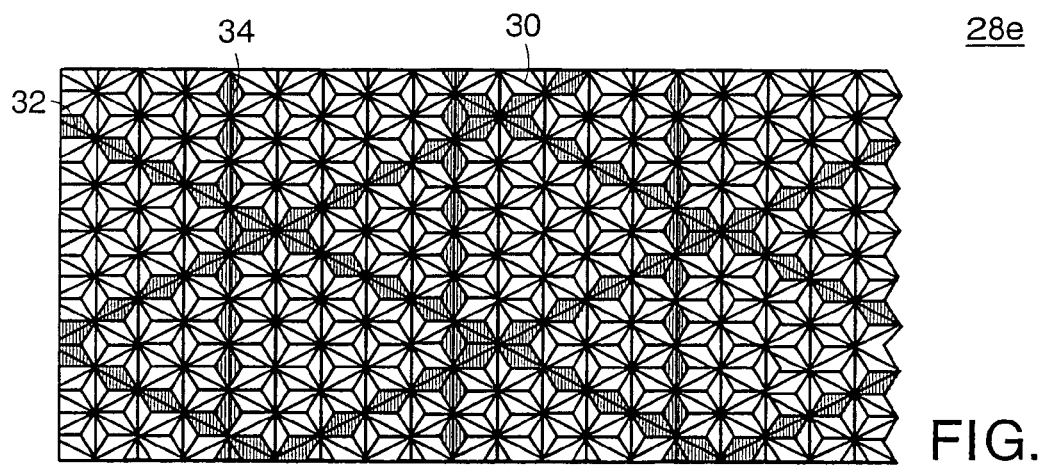
FIG. 16 illustrates a plan view of a retroreflective sheeting having multi-planar faces in three sets of grooves and spaced every fifth V-shaped groove.
Figure 17:
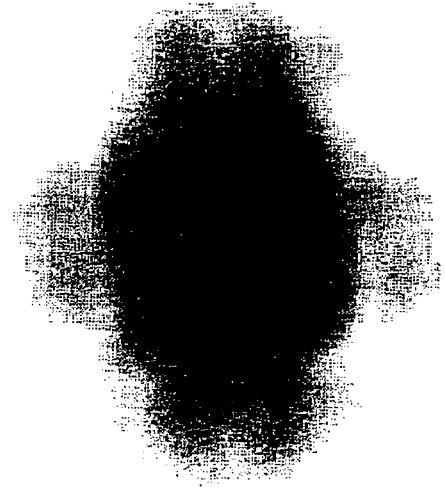
FIG. 17 displays the retroreflective light output pattern at a far field from air-backed retroreflective sheeting with multi-planar faces constructed according to the array disclosed in FIG. 13.

The retroreflective sheeting 28e of FIG. 16 illustrates multi-planar faces of the prisms faces adjacent certain V-shaped grooves 30, 32, and 34. In this embodiment, the multi-planar faces adjacent every fifth V-shaped groove are multi-planar. The light output patterns illustrated in FIGS. 20 and 24 for the air-backed sheeting and metalized sheeting, respectively, are fairly concentrated. These patterns disclose more compressed patterns than the patterns shown in FIGS. 19 and 23 because sheeting 28e has fewer multi-planar faces to spread out the light. The amount of compression can be varied depending upon the amount of prisms that have a second face on a facet. The greater the number of prisms that have multi-planar faces, the greater the cone of divergence for the returned light.

Equivalents

While this invention has been particularly shown and described with references to preferred embodiments thereof, it will be understood by those skilled in the art that various changes in form and details may be made therein without departing from the spirit and scope of the invention as described by the appended claims.

What is claimed is:

1. A method of forming retroreflective sheeting comprising the steps of:
  a) forming a first mold by forming a plurality of grooves in a body of mold material, the grooves intersecting at an angle to form an array of prisms formed into pairs of prisms, each prism comprising a base aperture and three intersecting lateral faces which meet at an apex, each of the lateral faces having a base edge which forms a portion of the perimeter of the base aperture and said base edge of each lateral face intersects the base edge of a contiguous lateral face to form a base point, wherein a first face of at least one prism in the array includes a first face first planar surface and a first face second planar surface, the first face first planar surface and the first face second planar surface being contiguous along an edge, the edge substantially parallel to the base edge of the first face, having a first end point and a second end point which forms at least a portion of a middle aperture, wherein the apex, the first end point, and a first base point are coplanar and form a continuous edge from the first base point to the apex;
  b) forming a second mold in the first mold, the second mold comprising a negative prism array pattern;
  c) forming said sheeting in said second mold; and
  d) removing the sheeting from the second mold.

2. The method of claim 1, wherein a second face of the prism having the first face first planar surface and the first face second planar surface includes a second face first planar surface and a second face second planar surface.

3. The method of claim 2, wherein a third face of the prism having the first face first planar surface and the first face second planar surface includes a third face first planar surface and a third face second planar surface.

4. The method of claim 1, wherein at least one base edge of the prisms includes a length between about 0.002 and 0.05 inches (0.0508 and 1.27 millimeters).

5. The method of claim 1, wherein the first face first planar surface and the first face second planar surface form a convex shape as viewed from the exterior of the prism.

6. The method of claim 1, wherein the first face first planar surface and the first face second planar surface form a concave shape as viewed from the exterior of the prism.

7. The method of claim 1, further comprising providing a metalized layer on at least some of the lateral faces.

8. The method of claim 1, wherein the lateral faces are air-backed.

9. The method of claim 1, further comprising forming the array of prisms in the first mold such that they are negatively canted.

10. The method of claim 9, wherein the array of prisms in the first mold are canted between about negative one and negative fifteen degrees.

11. The method of claim 1, further comprising forming the array of prisms in the first mold such that they are positively canted.

12. The method of claim 11, wherein the array of prisms in the first mold are canted between about one and fifteen degrees.

13. A method for forming a master mold used to form retroreflective sheeting molds, comprising:
  cutting a first plurality of parallel grooves in a surface of a substrate;
  cutting a second plurality of parallel grooves in the surface of the substrate, the second plurality of parallel grooves oriented at an intersecting angle to the first plurality of parallel grooves; and
  cutting a third plurality of parallel grooves in the surface of the substrate, the third plurality of parallel grooves oriented at intersecting angles to the first plurality of parallel grooves and the second plurality of parallel grooves such that the first plurality of intersecting grooves, the second plurality of intersecting grooves, and the third plurality of intersecting grooves intersect at angles to form an array of prisms formed into pairs of prisms, each prism comprising a base aperture and three intersecting lateral faces which meet at an apex, each of the lateral faces having a base edge which forms a portion of the perimeter of the base aperture and said base edge of each lateral face intersects the base edge of a contiguous lateral face to form a base point, wherein a first face of at least one prism in the array includes a first face first planar surface and a first face second planar surface, the first face first planar surface and the first face second planar surface being contiguous along an edge, the edge substantially parallel to the base edge of the first face, having a first end point and a second end point which forms at least a portion of a middle aperture, wherein the apex, the first end point, and a first base point are coplanar and form a continuous edge from the first base point to the apex.

* * * * *